May 20, 1952 G. W. HOPKINS ET AL 2,597,487
AUXILIARY TENS-TRANSFER MECHANISM
Filed April 19, 1949 7 Sheets-Sheet 1

FIG-1

INVENTORS
GEORGE W. HOPKINS
JON E. GROBL
BY

May 20, 1952

G. W. HOPKINS ET AL 2,597,487

AUXILIARY TENS-TRANSFER MECHANISM

Filed April 19, 1949

INVENTORS
GEORGE W. HOPKINS
BY JON E. GROBL

FIG_5

FIG_6

INVENTORS
GEORGE W. HOPKINS
BY JON E. GROBL

May 20, 1952 G. W. HOPKINS ET AL 2,597,487
AUXILIARY TENS-TRANSFER MECHANISM
Filed April 19, 1949 7 Sheets-Sheet 4

FIG-7

INVENTORS
BY GEORGE W. HOPKINS
JON. E. GROBL

May 20, 1952     G. W. HOPKINS ET AL     2,597,487
AUXILIARY TENS-TRANSFER MECHANISM Filed April 19, 1949     7 Sheets-Sheet 6

FIG_9

INVENTORS
GEORGE W. HOPKINS
BY   JON E. GROBL

Patented May 20, 1952

2,597,487

UNITED STATES PATENT OFFICE 2,597,487

AUXILIARY TENS-TRANSFER MECHANISM

George W. Hopkins, San Leandro, and Jon E. Grobl, Oakland, Calif., assignors to Friden Calculating Machine Co., Inc., a corporation of California Application April 19, 1949, Serial No. 88,442

13 Claims. (Cl. 235—133)

This invention relates to calculating machines and is more particularly concerned with an improvement in the transfer mechanisms for the registers of such machines.

In certain known types of calculating machines, the register wheel carriage, when in its initial position, projects beyond the left side of the machine due to the fact that the shiftable register must have a capacity which is considerably greater than that of the actuator mechanism situated within the main body portion of the machine. Hence, in calculating machines of the Thomas type wherein the transfer actuating mechanism for the register is located in the stationary or main body portion of the machine, those orders of the register which lie beyond the left side of the machine are beyond the range of the transfer mechanism and therefore are incapable of effecting the necessary carry-overs from one order of the register to the next. In the past, it has been customary to provide machines of this type with a warning device for notifying the operator that a carry from the highest inboard order of the register to the lowest outboard order thereof has been lost due to the lack of a mechanism for effecting this carry. The operator may then correct the reading of the register dials by manually entering the unit which was lost during the calculation.

According to the present invention, this limitation is overcome by providing an auxiliary transfer mechanism in the register wheel carriage itself which will mechanically effect the transfer of a unit between the inboard and outboard orders of the register and also between the various outboard orders thereof whereby the operator need have no concern regarding the correctness of the amount indicated by the numeral wheels of the register at the end of the calculation. This improvement is accomplished by providing a coupling means between the highest inboard order and the lowest outboard order and also between each of the outboard orders of the register which coupling means is normally ineffective to cause the transfer of a unit from one order to the next, but which is rendered operative during a portion of each cycle of operation of the machine. Means is also provided whereby the auxiliary transfer mechanism will only be rendered operative in those orders which lie outboard or to the left of the main transfer mechanism so as to prevent any overlapping of the two transfer mechanisms as the register wheel carriage is moved toward the right from its initial position. In addition, the auxiliary transfer mechanism is arranged to be disabled during automatic division operations so as to prevent unnecessary wear and tear on this mechanism which would be caused by the overdraft and corrective cycles which take place during division operations.

Accordingly, it is an object of the present invention to provide an improved transfer mechanism for calculating machines of the type having a register wheel carriage which shifts relative to the main transfer mechanism of the machine, wherein the required transfers between adjacent register wheels will be effected in the outboard orders of the register as well as in the inboard orders thereof.

Another object of the invention is to provide an auxiliary transfer mechanism for the outboard orders of the register which comprises a series of coupling devices for effectively connecting adjacent orders of the register for the transfer of a unit from a lower order wheel to a higher order wheel in accordance with the requirements of the calculation.

Another object of the invention is to provide an auxiliary transfer mechanism for the outboard orders of the register which is normally ineffective in the full cycle position of the machine but which is rendered effective for effecting a carry-over between adjacent outboard order wheels during the latter part of each machine cycle.

Another object of the invention is to provide an auxiliary transfer mechanism which is normally disabled in the full cycle position of the machine and which is conditioned for operation during each machine cycle only in those orders of the register which lie to the left of the main transfer mechanism of the machine.

Another object of the invention is to provide an auxiliary transfer mechanism for the outboard order wheels of the register which is adapted to be disabled in its entirety during automatic division operations.

Other objects and advantages will become apparent from the following description of one particular embodiment of the invention illustrated in the accompanying drawings in which.

*General description*

In the accompanying drawings, the invention is shown as applied to a calculating machine of the type disclosed in Patent No. 2,229,889, issued to Carl M. F. Friden on January 28, 1941. In this machine, amounts to be entered into the numeral wheels of the shiftable register are first set up on a keyboard provided with a plurality of amount keys 20 (Fig. 1) which are mounted for substantially vertical sliding movement in the framework of the machine by means of a pair of elongated slots 21 formed in each key stem through which pass a pair of through-rods 22 which are supported at either end in the framework of the machine. Each key stem 20 is provided with a notch 23 which cooperates with a latching slide 24 which is adapted to enter the notch 23 when the key is depressed so as to retain the key in its depressed position against the urgency of a return spring 25. Each key stem is provided at its lower end with a stud 26 which lies immediately above a cam face 27 provided on a selector bar 28 which is mounted for endwise shifting movement in the framework of the machine by means of a pair of pivoted links 29 (only one shown).

Two selector bars 28 are provided for each row of amount keys, one bar being provided with cam faces 27 arranged to lie beneath the studs 26 on the "1" to "5" keys while the other bar 28 is provided with cam faces 27 lying beneath the studs 26 on the "6" to "9" keys. Differential movement of selector bars 28 is obtained by varying the angle of inclination of the cam faces 27 so as to cause the bars to move forward by differential amounts whenever a key 20 in that particular bank of keys is depressed.

Each selector bar is operatively connected at its rear end with a selector gear 30 which is slidably but non-rotatably mounted on a square shaft 31. This shaft is journalled at its forward end in a cross bar 32 which is supported between the right side frame (not shown) and the left side frame 33 of the machine. At its rear end, the shaft is journalled in a cross bar 34 which, like the bar 32, is supported between the side frames of the machine. Each selector gear 30 is provided with ten teeth and is arranged to cooperate with a series of differentially stepped teeth 35 provided on an actuator drum 36 mounted on an actuator shaft 37 journalled at its forward end in the cross bar 32 and at its rearward end in a cross bar 38 which is fastened to the framework of the machine. Mounted on the forward end of the shaft 37 is a bevel gear 39 which meshes with a similar bevel gear 40 secured to a transverse power shaft 41 journalled between the side frames of the machine.

As fully shown and described in the above-named Patent No. 2,229,889, the calculating machine is provided with an electric motor which is arranged to drive the shaft 41 in a cyclic manner by means of a suitable clutch mechanism. Hence, the actuator shafts 37 will be given cycles of operation and thereby cause the square shaft 31 to be rotated by the actuator drum 36 through one to nine steps of movement in accordance with the value of the key depressed.

Immediately to the rear of the drum 36 on the shaft 37 is a second actuator drum 42 which is provided with a series of differential stepped teeth 43 which are adapted to cooperate with a second pair of selector gears (not shown) which are settable from a second row of keys by means of a second set of selector bars (not shown) in exactly the same manner as the selector gears 30. Hence, for each row of keys provided on the keyboard of the machine, there is provided a pair of selector bars, a related pair of selector gears, a square shaft 31 and an actuator drum for operating the selector gears. Inasmuch as two actuator drums are provided on each actuator shaft 37, there need be only half as many actuator shafts in the machine as there are banks of keys.

Slidably but non-rotatably mounted on the rear end of each square shaft 31 is a spool 50 on the forward end of which is mounted a ten-toothed add gear 51 and on the rear end of which is mounted a ten-toothed subtract gear 52. Lying in the space between the gears 51 and 52 is a transverse bail or gate 53 which extends across the machine and is supported at either end by arms 54 (only one shown) which are secured to a gate shaft 55 journalled between the side frames of the machine.

As described in Patent No. 2,229,889, the gate shaft 55 may be rocked either clockwise or counter-clockwise so as to cause either the add gears 51 or the subtract gears 52 to be moved into mesh with a series of ten-toothed gears 56 mounted on the lower ends of a series of register wheel shafts 57 which are journalled in suitable bearings provided in a hollow carriage frame bar 58. On the upper end of each shaft 57 is a numeral wheel 59 which has inscribed around the periphery thereof the numerals "0" to "9" which may be viewed through an aperture 60 provided in a carriage cover 61. Each numeral wheel 59 is provided with a twirler knob 62 which extends through a suitable aperture provided in the cover 61 so as to enable the register wheel to be manually rotated to any desired position where it will yieldably be retained by means of a star wheel 63 secured to the lower end of the shaft 57 which wheel is contacted by a spring-pressed ball mounted in a bore provided in the frame bar 58.

Figure 1:
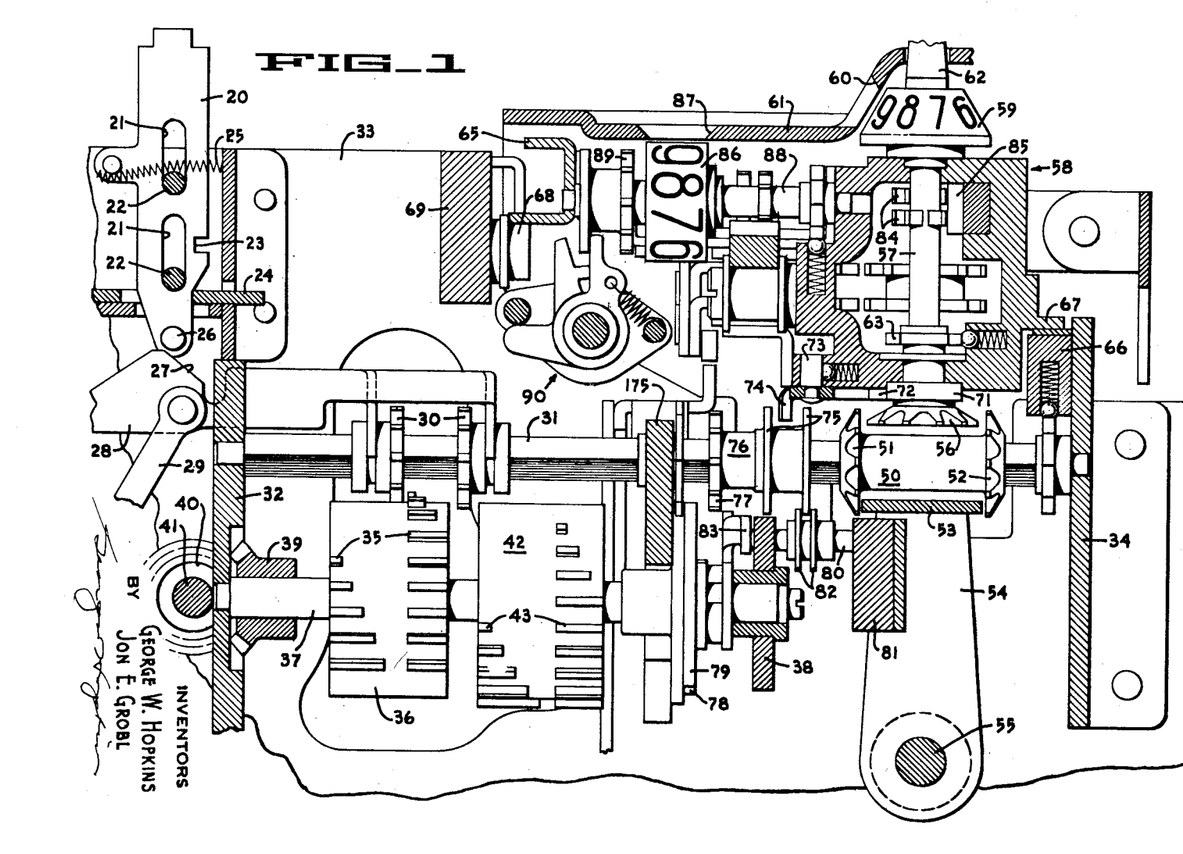
Fig. 1 is a fragmentary longitudinal sectional view showing the selecting, actuating, and transfer mechanisms of a well-known type of calculating machine.

Secured to either end of the carriage frame bar 58 is a carriage end frame 64 (Fig. 2) (only one shown), which end frames are connected together at their forward ends by means of a guide rail 65. The frame bar 58, end frames 64, and guide rail 65 comprise the main framework of the shiftable register carriage which is supported for endwise shifting movement on the machine frame. For this purpose, the cross bar 34 (Fig. 1) has secured thereto a bearing rail 66 which lies beneath a lip 67 formed on the frame bar 58 and thus serves as a guide and a support for the rear end of the shiftable carriage. The guide rail 65 which extends across the front of the carriage is supported on and guided by a plurality of guide rolls 68 which are rotatably journalled on a cross bar 69 which is secured at either end to the side frames of the machine. Hence, the carriage and the register wheels may be shifted relative to the spools 50 so as to change the ordinal relationship between the register wheels and the various orders of the actuating mechanism mounted in the framework of the machine as desired. When the gate 53 is in its neutral position, as shown in Fig. 1, ordinal shifting movements of the carriage may be effected without interference on the part of the add-subtract gears 51, 52 since in this position of the gate, the gears 56 mounted on the lower ends of the register wheel shafts 57 are free to move through the space existing between the add-subtract gears. Means may be provided, as shown and described in U. S. Patent No. 2,294,083, issued to Carl M. F. Friden on August 25, 1942, for shifting the carriage in either direction from one ordinal position to another by power driven means controlled either by a pair of manually operable shift keys or by certain function controlled mechanisms which are customarily provided in machines of this character.

Secured to each shaft 57, just above the gear 56, is a transfer cam 71 which cooperates with a transfer lever 72. This lever is pivotally mounted in the frame bar 58 by means of a stud 73 which is secured to the transfer lever and is journalled in a bore provided in the frame bar. Each transfer lever 72 has formed thereon a bent-over ear 74 which lies between a pair of flanges 75 formed on a hub 76 of a transfer gear 77 which is slidably but non-rotatably mounted on the square shaft 31 in the next higher order. The transfer gears 77 are each provided with ten teeth and are each adapted to cooperate with a single tooth 78 formed on a transfer actuator 79 mounted on each of the actuator shafts 37. The transfer gears are yieldably maintained in either their rearward or inactive positions or in their forward or active positions by means of detent pins 80 which are slidably mounted in the cross bar 38 and also in an auxiliary frame bar 81. Each pin 80 is provided with a pair of flanges 82 which embrace a flange on its associated transfer gear so as to cause the pin 80 to partake of the sliding movements of the transfer gear. The pins 80 are suitably detented in either their forward or rearward positions by means of spring-pressed balls (not shown) mounted in the cross bar 81, each ball being adapted to engage with either one of a pair of notches (not shown) formed in the rear ends of the pins 80.

It will be seen from the foregoing description that each time a numeral wheel passes from "9" to "0" or from "0" to "9" the cam 71 will oscillate its associated transfer lever 72 and cause the transfer gear 77 in the next higher order to be moved into the path of the actuator tooth 78 for that order. The gear 77 will be maintained in its forward position by detent pin 80 until after the gear has been rotated one tooth space by the tooth 78, after which the gear will be returned to its rearward or inactive position by means of a restore cam 83 mounted on the actuator shaft 37. The above-described mechanism, i. e., transfer cams 71, transfer levers 72, transfer gears 77 and transfer actuator teeth 78 comprise what will hereinafter be referred to as the conventional or main transfer mechanism of the machine.

The calculating machine presently being described is provided with six actuator shafts 37 and twelve square shafts 31 so that the twelfth numeral wheel 59 from the right-hand end of the register is normally the highest order wheel to receive a transfer impulse from the main transfer mechanism when the carriage is in its leftmost or normal position. Hence, the first twelve orders of the register may be considered to comprise the inboard orders thereof when the carriage is in its normal position, whereas all of the higher orders of the register may be considered as constituting the outboard orders of the register. However, if the carriage is shifted, say, two ordinal spaces to the right, then the thirteenth and fourteenth order wheels will lie within the range of the main transfer mechanism and will now be included in the inboard group of wheels, whereas the wheels lying in the fifteenth and all higher orders will now constitute the outboard orders of the register.

Means is provided for simultaneously resetting all of the numeral wheels 59 to their "0" positions and for this purpose each shaft 57 is provided with a mutilated gear 84 which is adapted to cooperate with a resetting rack 85 which is mounted for longitudinal sliding movement within the frame bar 58. This resetting mechanism is of conventional design and may be similar to that shown and described in Patent No. 2,294,083, supra. As therein described, this mechanism may be either manually operated by means of a resetting knob located on the right-hand end of the carriage or may be operated by power derived from one of the actuator shafts 37.

For the purpose of registering the number of cycles performed by the machine with the carriage located in any one of its various ordinal positions, the shiftable carriage has mounted thereon a plurality of numeral wheels 86 which are viewable through a window 87 provided in the cover 61 of the carriage. Each numeral wheel 86 is mounted on a horizontal shaft 88 which is journalled at its rear end in the frame bar 58 and at its forward end in the guide rail 65. Also mounted on each shaft 88 is an actuator gear 89 which is adapted to be operated by a revolutions counter actuator 90 which is journalled in the framework of the machine and serves to rotate numeral wheel 86 located in cooperative relationship with the lowest order of the actuator 90 one step on each cycle of operation of the machine and also serves to perform the necessary transferring operations in the higher order wheels 86. This mechanism is of conventional design and reference may be had to Patent No. 2,229,889 for a detailed description thereof.

*Auxiliary transfer mechanism*

In order to extend the transferring of units of one order of the register to the next higher order thereof beyond the twelfth numeral wheel 59, the machine shown in the accompanying drawings is provided with an auxiliary transfer mechanism which is located on the shiftable carriage and which enables transfers to be effected throughout the entire capacity of the register.

Figure 3:
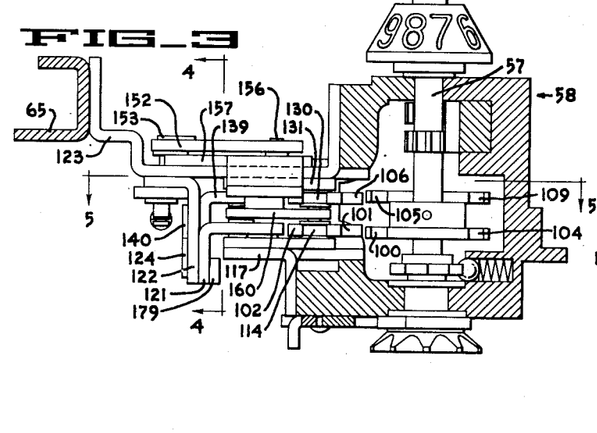
Fig. 3 is a sectional view taken along the line 3—3 in Fig. 2.
Figure 5:
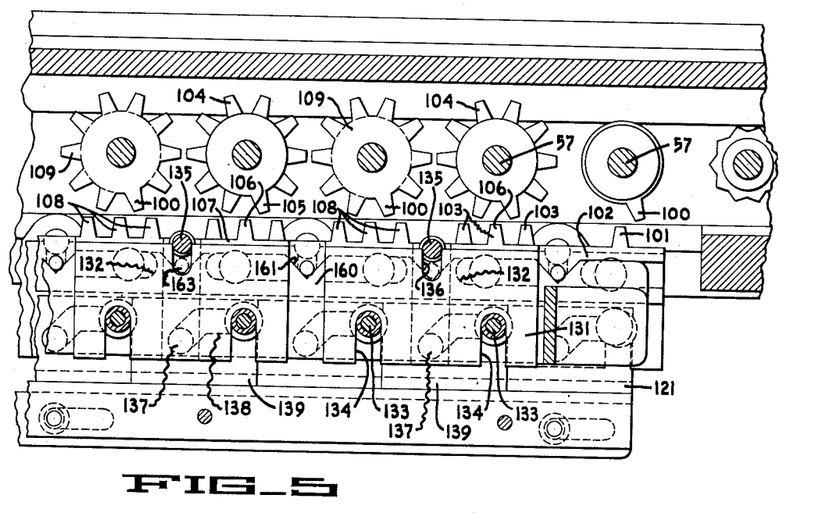
Fig. 5 is a sectional view taken along the line 5—5 in Fig. 3.
Figure 6:
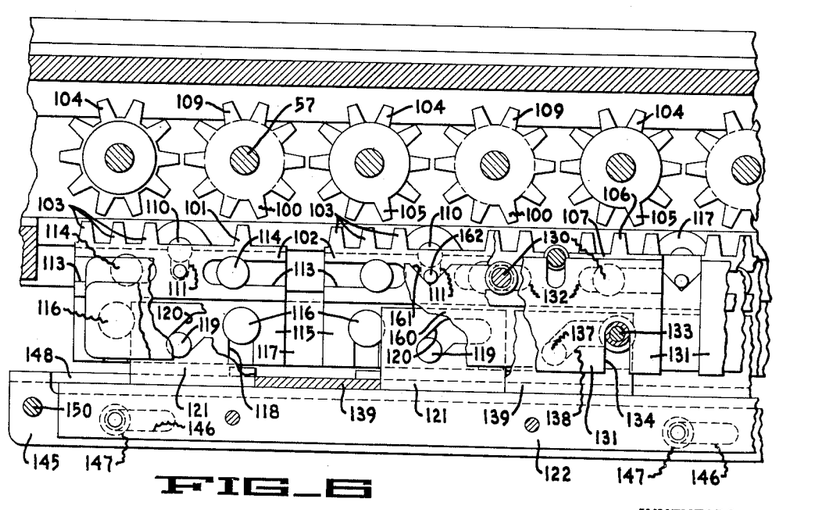
Fig. 6 is a sectional view similar to Fig. 5 but with certain parts removed so as to more clearly illustrate the construction of the auxiliary transfer mechanism.

As shown in Fig. 3, the register wheel shaft 57 in the twelfth order of the register has secured thereto a transfer tooth 100 (see also Fig. 5) which is adapted to engage with a single tooth 101 provided on a drive-transmitting transfer rack device 102. The rack device 102 is also provided with a series of three teeth 103 which lie in cooperative relationship with a ten-toothed gear 104 secured to the register wheel shaft 57 in the thirteenth order of the register. As shown in Figs. 5 and 6, a rack 102 is likewise provided between the fourteenth and fifteenth orders, between the sixteenth and seventeenth orders, and so on throughout the capacity of the register. Likewise, on each of the even order register wheel shafts 57 above the twelfth order there is provided a transfer tooth 100 which is adapted to cooperate with the tooth 101 on its associated rack 102. On each of the register wheel shafts 57 located in the uneven orders of the register, i. e., in the thirteenth, fifteenth, seventeenth, etc., orders, there is mounted a transfer tooth 105 which lies opposite a single tooth 106 formed on a drive-transmitting transfer rack device 107 which racks are also provided with a series of three teeth 108 which lie opposite transfer gears 109 which are similar to the gears 104 but are mounted on the shafts 57 located in the even orders of the register. Hence, the racks 107 serve to operatively couple the thirteenth and fourteenth orders of the register in driving relation for the transfer of a unit each time the numeral wheel 59 in the thirteenth order moves from "9" to "0" or vice versa, and in a similar manner serve to couple the fifteenth and sixteenth orders, the seventeenth and eighteenth orders, and so on throughout the entire capacity of the register.

As shown in Fig. 3, the transfer teeth 100 and 105 lie in different horizontal planes, as do also the racks 102 and 107, so as to enable the racks to overlap one another, as shown in Fig. 5, as is necessary in order to provide for a connection between adjacent orders of the register for transferring purposes.

As shown in Fig. 6, each rack 102 is provided with a pair of elongated slots 113 which embrace a pair of headed studs 114 which are secured to a slide 115 which is mounted for sliding movement either toward or away from the register wheel shafts 57 by means of headed studs 116 which are mounted in an angle bracket 117 which, as shown in Fig. 3, is attached to the forward face of the frame bar 58 of the carriage. The slides 115 are further guided by means of headed studs 110 which are mounted on the bracket 117 and which cooperate with an open-ended slot 111 formed in the rear edge of each of the slides 115. The slides 115 are guided for movement on the studs 116 by means of a pair of elongated slots 118, as shown in Fig. 6 of the drawings. Each slide 115 carries a stud 119 which is received within an angularly disposed slot 120 provided in an actuating slide 121. As shown in Fig. 3, the slides 121 are of an angular cross section and are slidably supported on an angle bracket 122 which, in turn, is secured to a carriage frame plate 123 which is supported between the guide rail 65 and the carriage frame bar 58. The slides 121 are guided for endwise sliding movement on the bracket 122 by means of a pair of headed studs 124 (see also Fig. 4) which are fastened to the slide 121 and are received within elongated slots 125 provided along the lower edge of the bracket 122.

Figure 4:
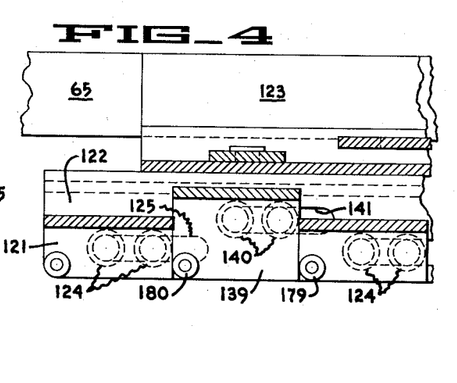
Fig. 4 is a sectional view taken along the line 4—4 in Fig. 3.

The racks 107, like the racks 102, are mounted for endwise sliding movement on a slide 131 by means of headed studs 130 which are secured to the slide 131 and which cooperate with a pair of elongated slots 132 formed in the racks 107. The slides 131 are, in turn, guided for sliding movement either toward or away from the register wheel shafts 57 by means of headed studs 133 which are secured to the frame plate 123 and cooperate with a pair of open-ended slots 134 provided in each slide 131. Each of the slides 131 is further guided for rectilinear movement by means of a headed stud 135 which is mounted in the plate 123 and cooperates with an open-ended slot 136 provided in the rear edge of the slide 131. Secured to the underneath side of each slide 131 is a stud 137 which is received within an angular slot 138 provided in an actuating slide 139 which, like the slide 121, is mounted for sliding movement on the bracket 122 by means of a pair of headed studs 140 which are secured to the slide 139 and travel within a slot 141 (see Fig. 4) provided in the bracket 122. As shown in Figs. 3, 4 and 6, the vertically disposed portions of the actuating slides 121 and 139 lie in an abutting relationship so that whenever one of the slides 121 or 139 is moved toward the left, as viewed in Fig. 6 (right, as viewed in Fig. 4) all slides to left of the slide which is actuated will likewise be moved toward the left. Thus, each pair of adjacent slides 121, 139 constitutes a one-way-drive assembly, the lower order slide of which cooperates with the higher order slide for driving the latter.

Whenever any of the slides 121 is moved toward the left by means of an actuating mechanism which will subsequently be described herein, the slot 120 (Fig. 6) in the slide will cause the stud 119 on the slide 115 to be moved rearwardly, thereby causing the rack 102 to be moved toward the rear so as to engage the teeth 103 on the rack with the teeth of the gear 104 and at the same time will cause the tooth 101 to be moved into the path of the transfer tooth 100 secured to the register wheel shaft 57 in the next lower order of the register. In this way the transferring connection between the rack 102, the gear teeth 104, and the transfer tooth 101 will be conditioned for operation. In a similar manner, whenever one of the actuating slides 139 is moved toward the left, as viewed in Figs. 5 and 6, the slot 138 on the slide will cause the stud 137 on the slide 131 to be moved rearwardly so as to carry the transfer rack 107 toward the rear of the machine. The teeth 108 on the rack will thereby be brought into engagement with the teeth of the gear 109 and at the same time the single tooth 106 on the rack will be moved into the path of the transfer tooth 105 in the next lower order so as to effectively couple the two adjacent orders of the register for the transfer of a unit from the lower order wheel to the higher order wheel.

It will be noted from the drawings that the racks 102 and 107 will be limited in their movement in either direction under the influence of the transfer teeth 100 and 105 by the engagement of the ends of slots 113 and 132 with the studs 114 and 130, respectively. The distance through which the racks are permitted to move before the ends of the slots engage with their respective studs is such as to cause the gears 104 and 109 to be rotated through one tooth space, or $\frac{1}{10}$ of a revolution. The racks are then positively stopped and hence the possibility of overthrow of the gears is absolutely eliminated.

Figure 2:
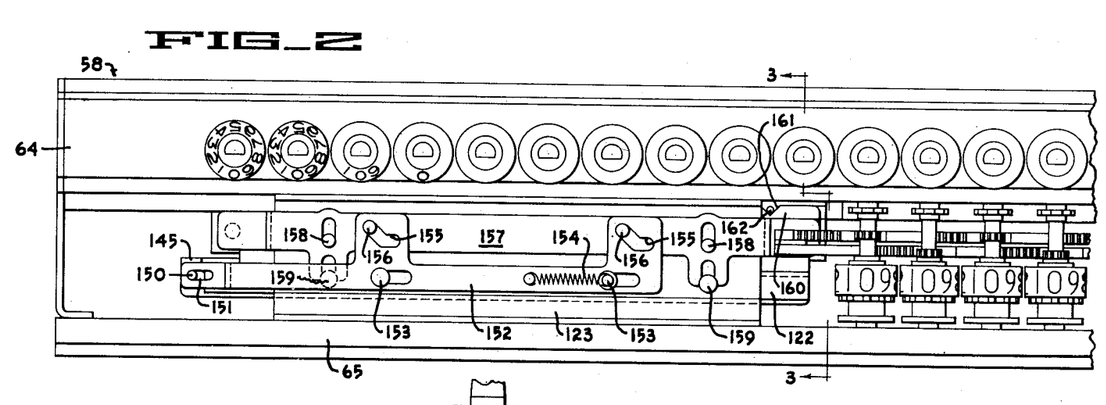
Fig. 2 is a plan view of the left-hand portion of the register wheel carriage, the carriage cover being removed in this view in order to expose the auxiliary transfer mechanism.
Figure 7:
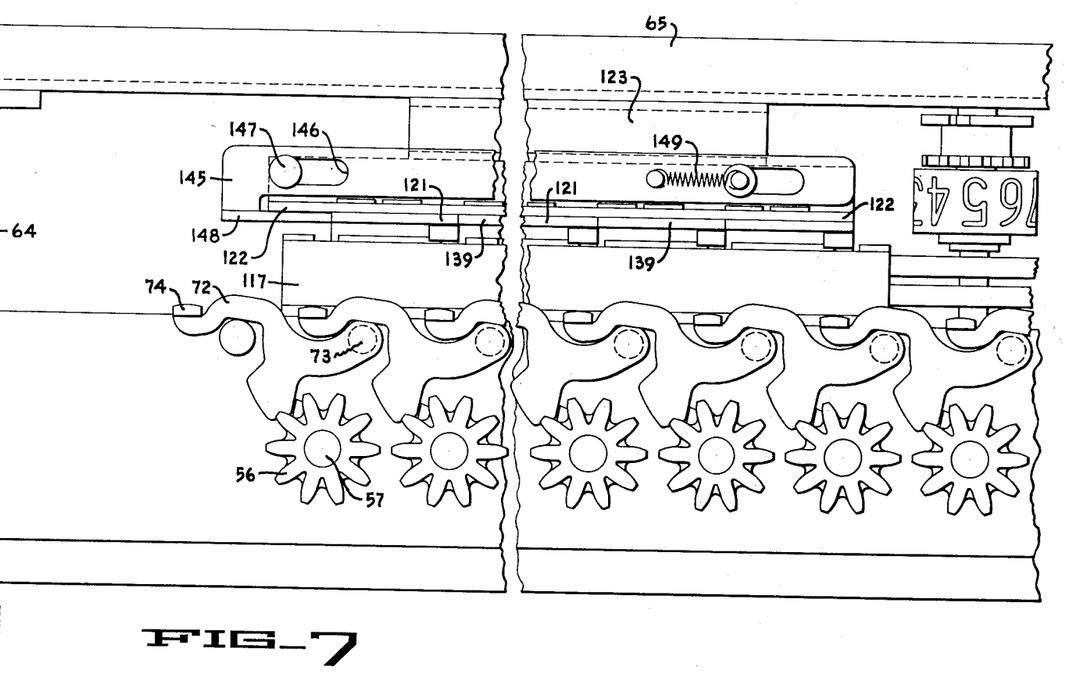
Fig. 7 is a view of the underneath side of the left end of the carriage.
Figure 8:
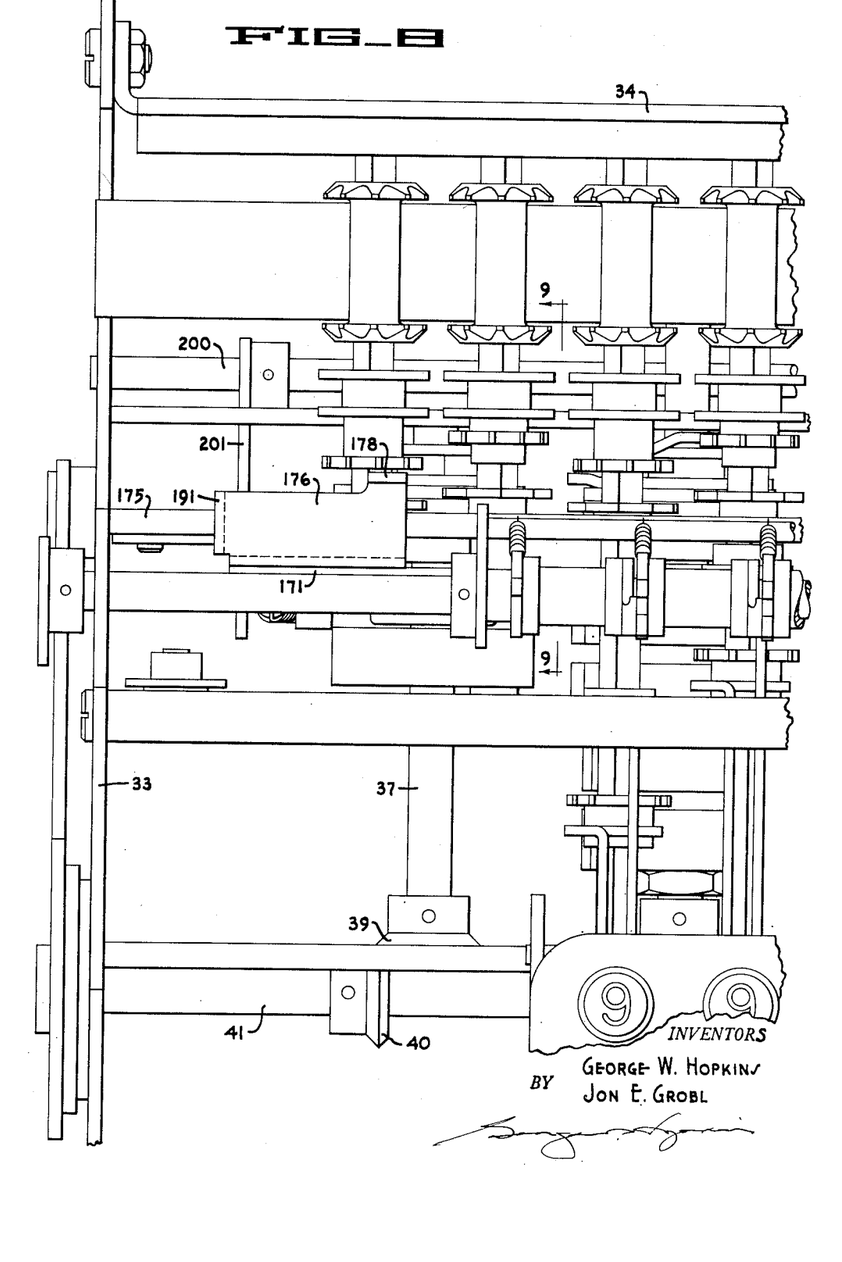
Fig. 8 is a plan view of the upper left-hand corner of the calculating machine with the carriage removed.

As shown in Fig. 6 of the drawings, a slide member 145 is mounted for endwise sliding movement on the underside of the bracket 122 by means of elongated slots 146 formed in the slide which cooperate with headed studs 147 mounted in the bracket. The member 145 is provided with a formed-over extension 148 which bears against the left-hand edge of the leftmost slide 121. Hence, whenever any of the slides 121, 139 are moved toward the left, as viewed in Fig. 6, so as to move the racks 102, 107 into transferring position, the slide member 145 will likewise be moved toward the left against the urgency of a spring 149 (Fig. 7) which normally maintains the member 145 in its right-hand position. As shown in Fig. 2 of the drawings, the member 145 is provided with an upstanding pin 150 which lies within a slot 151 provided in the left-hand end of a slide 152 which is mounted for sliding movement on the upper surface of the plate 123 by means of pin and slot connections 153. The slide 152 is urged toward the right, as viewed in Fig. 2, by a spring 154 and is provided with a pair of camming slots 155 which cooperate with pins 156 mounted in a restoring slide 157 which is mounted for sliding movement on the plate 123 by means of pin and slot connections 158 and 159. The slide 157 is connected at either end to a restoring plate 160 which, as shown in Fig. 6, is provided along its rearward edge with a series of V-shaped notches 161 which are adapted to cooperate with pins 162 and 163 provided on the racks 102 and 107, respectively.

When the slide member 145 is moved toward the left, as viewed in Fig. 2, as the result of a left-hand sliding movement of the slides 121 and 139, the slide 152 will likewise be moved to the left and the slide 157 will be moved toward the front of the carriage as the result of the cooperation between the slots 155 and pins 156. The notches 161 in the restoring plate 160 will thus be moved away from the pins 162 and 163 on the racks, thereby freeing the racks for endwise shifting movement as they are moved rearwardly into transferring position. At the end of the machine cycle, after the transfers have been effected by means of the auxiliary transfer mechanism, the slides 121 and 139 will be released, whereupon the spring 149 (Fig. 7) will restore the slides to their initial positions and the pin 150 in slide member 145 will release the slide 152 for right-hand movement under the influence of its spring 154, whereby the restoring plate 160 will be returned to its normal or rearward position. As the plate 160 moves rearwardly, the notches 161 therein will engage with any of the studs 162 or 163 which have been moved to one side or the other of their normal positions and return the pins and their related racks to their normal positions, thereby placing the auxiliary transfer mechanism in readiness for another tens-transferring operation.

*Driving mechanism for auxiliary transfer mechanism*

Figure 9:
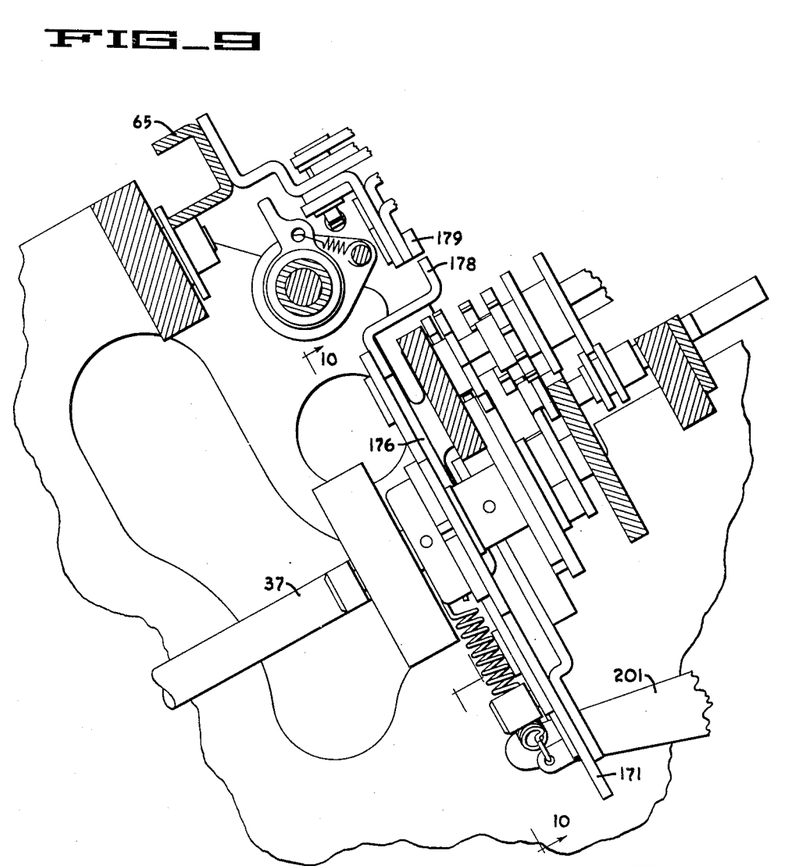
Fig. 9 is a sectional view taken along the line 9—9 in Fig. 8.
Figure 10:
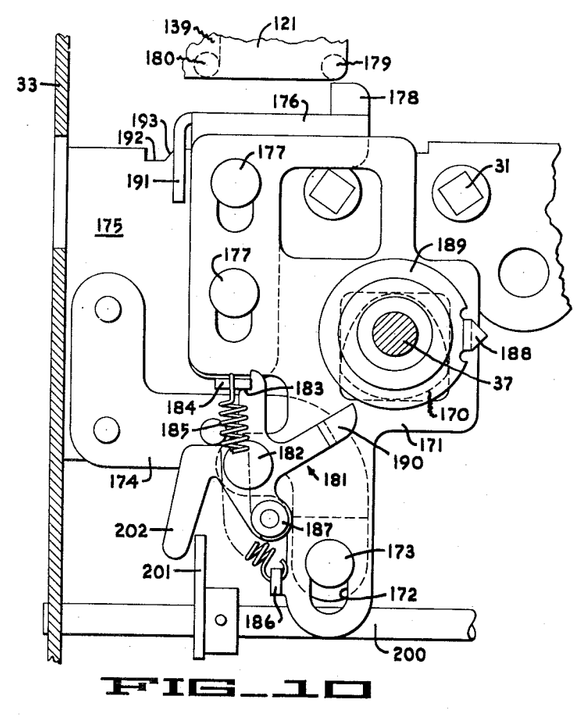
Fig. 10 is a sectional view taken along the line 10—10 in Fig. 9.

Means for operating the slides 121 and 139 of the auxiliary transfer mechanism is shown in Figs. 8 to 11, inclusive, of the drawings. As therein shown, the leftmost actuator shaft 37 of the machine carries a square motion cam 170 (Fig. 10) which lies within a square opening provided in a cam follower 171 mounted to move in a single plane. As shown in Fig. 10, the follower 171 is provided at its lower end with an elongated slot 172 which is engaged by a headed stud 173 secured to a bracket 174 which is fastened on a frame crossbar 175 which extends between the side frames of the machine. Hence, on each cycle of the calculating machine, the cam follower 171 is given a substantially rectangular pattern of movement. This movement is utilized to operate the slides 121 and 139 by means of a dog 176 which is slidably mounted on the follower 171 by means of pin and slot connections 177. The upper end of the dog 176 is formed-over, as shown in Fig. 9, so as to extend toward the rear of the machine where it is provided with an upstanding nose 178 which, in the normal position of the dog, lies directly beneath rolls 179 and 180 (see also Fig. 4) which are mounted on the slides 121 and 139, respectively.

As shown in Fig. 10, the dog 176 is normally maintained in its raised position with respect to the follower 171 by means of a pivoted latch 181 which is rotatably journalled on a stud 182 secured to the follower 171. The latch is provided with a shoulder 183 which normally lies beneath an ear 184 formed on the lower end of the dog so as to maintain the dog in its elevated position against the urgency of a spring 185 which is tensioned between the ear 184 and an ear 186 provided on the follower 171. The spring 185 bears against a roll 187 on the latch so as to urge the latch to rotate in a counter-clockwise direction as viewed in Fig. 10, thereby urging the shoulder 183 into position beneath the ear 184.

Figure 11:
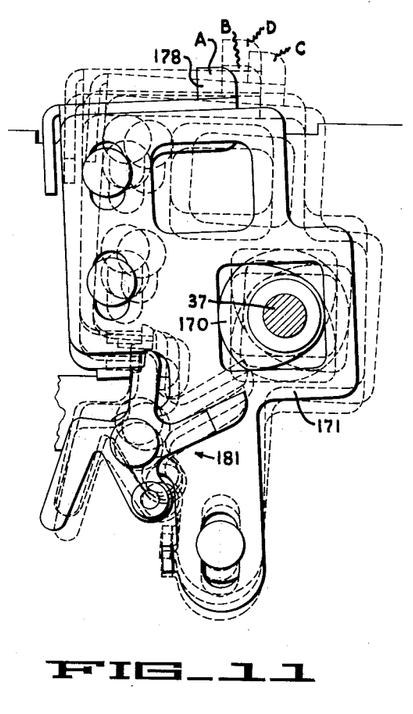
Fig. 11 is a sectional view similar to Fig. 10 but with the parts shown in their various moved positions.

The operation of the driving dog is best illustrated in Fig. 11, wherein the dog is shown both in its normal or full-cycle position and in three different moved positions. As therein shown, cam 170, follower 171, dog 176, nose 178 and latch 181 are shown in full lines in the positions they occupy in the full-cycle position of the machine. The position occupied by the nose 178 at this time is indicated by the letter A. The one-quarter cycle position of the nose 178 (i. e., the position it occupies after the square cam has rotated 90° in a counter-clockwise direction) is indicated at B in Fig. 11. At the end of 180° of movement, the lobe on the cam 170 will be located to the right of the shaft 37 and the nose 178 will be in the position marked C. At the end of 270° of rotation, the lobe on the cam will be located above the shaft 37 and the nose 178 will be in the position marked D. During the last 90° of movement of the shaft 37, the cam 170 will move to a position (full-cycle) where it lies to the left of the shaft 37 and near the end of this last portion of the rotation of the shaft 37, a tripping nose 188 provided on a cam 189 secured to the shaft 37 will engage with a finger 190 on the latch 181 so as to remove the shoulder 183 from beneath the ear 184 and permit the spring 185 to pull the dog 186 downward as shown in Fig. 11 so as to remove the nose 178 from the path of the rolls 179 and 180. Downward movement of the dog 176 is limited by a forked extension 191 provided thereon which engages over the cross bar 175 and bears against the top of this bar so as to limit downward movement of the dog. As shown in Fig. 10, the cross-bar 175 is provided on its upper edge with a notch 192 which is provided at its right-hand end with an inclined surface 193. When the nose 178 is in position A, the forked extension 191 bears against the bottom of the notch and the nose 178 is thereby permitted to assume a completely retracted position with respect to the rolls 179 and 180. As the finger moves from A to B, the extension 191 rides up the surface 193 and regains the upper edge of the bar as shown in Fig. 10.

The latch 181 will be permitted to re-engage with the ear 184 on the dog during the first 90° of movement of the cam 170 on the next succeeding cycle of the machine when the follower 171 will be moved downwardly to its lowermost position, thereby carrying the latch down to a point where the shoulder 183 moves below the ear 184 and is re-engaged therewith by the spring 185. As the cycle continues, the nose 178 will be moved from the position B to the position C where it will move up behind a roll 179 or 180, then to the position D where it will force the roll and its associated slide to the left and then, near the end of the cycle, will be caused to drop down out of the path of the roll by the action of the nose 188 acting on the finger 190 of the latch.

The release of the dog 176 by the latch 181, toward the end of the machine cycle, is necessary in order to obtain a quick return of the nose 178 at the very end of the cycle so that it will lie out of the path of the rolls 179 and 180 at the conclusion of the machine cycle.

*Auxiliary transfer mechanism disabled during division*

On division operations of a machine of the type herein shown and described, the operation of the auxiliary transfer mechanism is unnecessary due to the right-hand shifting of the carriage during division to such a position as to bring the highest digit of the dividend in the accumulator into alignment with the highest digit of the divisor on the keyboard. It is therefore desirable in division operations to disable the auxiliary transfer mechanism so that it will not be unnecessarily subjected to the wear and tear which would otherwise occur during division.

For this purpose, the division control shaft 200 (Figs. 8 and 10) of the calculating machine, which shaft corresponds to shaft 228 shown in U. S. Patent No. 2,327,981, issued to Carl M. F. Friden on August 31, 1943, is provided at its left-hand end with a forwardly directed arm 201 which, as shown in Figs. 9 and 10, is arranged to cooperate with a finger 202 provided on the latch 181. Hence, when the shaft 200 is rocked clockwise, as viewed from the right-hand side of the machine, at the outset of a division operation and is maintained in this position by the conventional automatic control mechanism of the calculating machine until the conclusion of the division problem, the arm 201 will be lifted and will act on the finger 202 in such a manner as to rotate the latch 181 clockwise, as viewed in Fig. 10, thereby preventing relatching of the dog 176 with the cam follower 171 during the first 90° of each cycle of operation of the machine as described above. Hence, the nose 178 will fail to be elevated by the follower as the cam 170 revolves, and therefore will not engage with the rolls 179 and 180 for the purpose of enabling the auxiliary transfer mechanism.

*Operation*

The operation of the previously-described auxiliary transfer mechanism is as follows:

In calculating machines of the type herein shown and described, the transfer of a unit into the twelfth order wheel of the register by the main transfer mechanism of the machine does not occur until near the conclusion of the machine cycle. Hence, it is unnecessary to prepare the auxiliary transfer mechanism in the carriage for the transfer of units from the twelfth to the thirteenth orders, and so on, until near the end of the cycle. Accordingly, as shown in Fig. 11, the nose 178 need not act on the rolls 179, 180 until the last part of the cycle, this action occurring as the nose moves from the position C to D, or somewhere between 180° and 270°.

When the register is in its leftmost or normal position, the roll 179 on the rightmost slide 121 will lie just above the nose 178 as shown in Fig. 10. When the machine is cycled, the nose 178 will move, as hereinabove described, so as to engage the roll 179 and move the slide 121 and all other slides 121 and 139 to the left of it toward the left end of the carriage so as to cause the racks 102 and 107 to be moved rearwardly into operative position with respect to the transfer teeth 100 and 105 and transfer gears 104 and 109 mounted on the register wheel shafts. Hence, if a unit is entered by the main transfer mechanism into the twelfth order wheel of the register and if this wheel is located at the transfer point, the tooth 100 in this order will engage the tooth 101 on the rack 102 associated therewith and shift the rack toward the right if the transfer is in an additive direction, or toward the left in case of a subtractive entry. The teeth 103 on the rack will thereby cause the gear 104 on the thirteenth order register wheel to be moved one step in a similar direction, whereupon the transfer tooth 105 in the thirteenth order will be moved one step and, if the thirteenth order wheel is at the transfer point, will engage with the tooth 106 on the rack 107 and cause this rack to be shifted either to the right or to the left, as the case may be, so as to cause the transfer of a unit into the fourteenth order wheel. This action will be continued throughout the capacity of the register until an order is reached wherein the register wheel is not at a transfer point whereupon the transferring action will cease.

Left-hand shifting movement of the leftmost slide 121 will, as previously described, cause the restore plate 160 to be moved forwardly, thereby releasing the pins 162 and 163 on the racks 102 and 107, respectively, from the restraining influence of the notches 161. When the nose 188 (Fig. 10) trips the latch 181 near the end of the cycle, the nose 178 will drop down away from the roll 179 and permit the spring 149 (Fig. 7) to return the slides 121 and 139 toward the right and also permit the spring 154 to return the restore plate 160 into its rearward position where the notches 161 will engage pins 162 and 163, thereby restoring the racks 102 and 107 to their central or normal positions. On the next cycle of operation of the machine, the cam follower 171 will move downwardly to the position shown in Fig. 10, whereupon the latch 181 will re-engage the dog 176 and cause the dog to be carried along with the follower 171 so as to engage the roll 179 and again condition the auxiliary transfer mechanism for operation.

In the event that the register carriage is shifted to the right so as to bring the higher order wheels of the register inboard of the machine, the auxiliary transfer mechanism in those orders which lie within the range of the main transfer mechanism will remain inactive inasmuch as the rolls 179 and 180 on the slides 121 and 139 in these orders will lie to the right of the nose 178 and therefore will not be shifted to the left during the machine cycle for the purpose of engaging the associated racks 102 and 107 with the transfer teeth and transfer gears mounted on the register wheel shafts 57.

Whenever the machine is conditioned for a division operation, the shaft 200 will be rocked and the arm 201 thereon will cam the latch 181 clockwise so as to disable the dog 176 and render the auxiliary transfer mechanism inoperative throughout the division operation.

We claim:

1. In a cyclically operable calculating machine having a frame, a carriage mounted for endwise shifting movement on said frame, and a plurality of ordinally arranged register wheels journalled in said carriage, certain of said wheels lying inboard of said frame and others of said wheels lying outboard thereof when said carriage is in its end position, the combination of a main transfer mechanism situated within said frame for effecting transfers in the inboard register wheels; and an auxiliary transfer mechanism mounted on said carriage for effecting transfers in the outboard register wheels, said last-named mechanism comprising a transfer tooth connected for movement with the highest order inboard wheel, a transfer gear and a transfer tooth connected for movement with each of the outboard register wheels, a series of drive-transmitting racks associated respectively with each of said transfer teeth and the transfer gear in the next higher order of the register, means mounting each of said racks for sliding movement selectively to a normal ineffective position in which said rack is incapable of meshing with the associated transfer tooth and transfer gear irrespective of the values standing in said register, and to an effective position in which said rack is meshed with the associated transfer gear and is conditioned to be engaged by the associated transfer tooth when a transfer from the lower order to the higher order is called for by a value-entering operation, whereby power available from movement of the register wheel in said lower order will act through said rack to effect transferring movement of the next higher order register wheel, and means for sliding those of said racks which are associated with outboard register wheels from ineffective to effective positions.

2. A calculating machine as defined in claim 1 including means for limiting the sliding movement of said racks to a predetermined extent so as to prevent overthrow of the register wheels during transferring operations.

3. A calculating machine as defined in claim 1 wherein said engaging means includes a plurality of ordinally arranged racks on said carriage, there being one such rack for each outboard order of said register, and a cyclically operable actuator mounted on said frame for operating said racks on each cycle of operation of the machine so as to cause said racks to be engaged and said auxiliary transfer mechanism to be rendered effective.

4. A calculating machine as defined in claim 3 wherein each pair of adjacent racks constitutes a one-way-drive assembly the lower order rack of which cooperates with the higher order rack of which, whereby operation of any one of said racks by said actuator causes all higher order racks to be operated.

5. A calculating machine as defined in claim 4 wherein said actuator and said racks are so positioned relative to one another as to cause the rack associated with the lowest outboard order to be operated on each cycle of operation of the machine whereby, regardless of the position of the carriage, only those racks associated with the outboard orders of the register will be operated.

6. In a cyclically operable calculating machine having a frame, a carriage mounted for endwise shifting movement on said frame, and a plurality of ordinally arranged register wheels journalled in said carriage, certain of said wheels lying inboard of said frame and others of said wheels lying outboard thereof when said carriage is in its end position, the combination of a main transfer mechanism situated within said frame for effecting transfers in the inboard register wheels; and an auxiliary transfer mechanism mounted on said carriage for effecting transfers in the outboard register wheels, said last-named mechanism comprising a transfer tooth connected for movement with the highest order inboard wheel, a transfer gear and a transfer tooth connected for movement with each of the outboard register wheels, a plurality of ordinally arranged elements mounted on said carriage for movement either toward or away from said transfer gears and transfer teeth; and a rack mounted for endwise sliding movement on each of said elements, said racks being arranged for movement tangentially of said transfer gears and transfer teeth whereby said racks may be engaged with said transfer gears and transfer teeth upon movement of said elements toward said gears and teeth and transfers may be effected between adjacent register wheels by endwise sliding movement of said racks under the influence of said transfer teeth.

7. The invention as recited in claim 6 wherein means is provided for limiting the endwise sliding movement of said racks to a predetermined extent whereby overthrow of the register wheels in transferring operations is positively prevented.

8. The invention as recited in claim 6 wherein said racks are normally disengaged from said transfer gears and transfer teeth and means is provided for causing said elements to be moved toward said gears and teeth in each cycle of operation of the machine.

9. The invention as defined in claim 8 wherein said last-named means includes a cyclically operable actuator mounted on said frame.

10. The invention as defined in claim 9 including means for causing all elements associated with higher order register wheels to be moved toward said transfer gears and transfer teeth whenever an element associated with a lower order register wheel is caused to move toward said gears and teeth by said actuator.

11. The invention as defined by claim 10 wherein said actuator is so located in said frame as to cause the element associated with the lowest outboard order to be operated on each cycle of operation of the machine whereby, regardless of the position of the carriage, only those elements associated with the outboard orders of the register will be moved toward the transfer gears and transfer teeth.

12. In a cyclically operable calculating machine having a frame, a carriage mounted for endwise shifting movement on said frame, a plurality of ordinally arranged register wheels in said carriage, certain of said wheels lying inboard of said frame and others of said wheels lying outboard thereof when the carriage is in its end position, the combination of a main transfer mechanism situated within said frame for effecting transfers in the inboard register wheels; and an auxiliary transfer mechanism mounted on said carriage for effecting transfers in the outboard register wheels, said last-named means including a transfer tooth connected for movement with the highest order inboard wheel, a transfer gear and a transfer tooth connected for movement with each of the outboard register wheels, a series of slidable racks for operatively connecting each transfer tooth with the transfer gear in the next higher order of the register, means for engaging and disengaging said racks and said transfer gears and transfer teeth on each cycle of operation of said machine, and means operated by said last-named means for restoring any displaced racks to their initial positions as they are being disengaged from said transfer gears and transfer teeth.

13. The invention as defined by claim 12 wherein said racks are mounted for movement from an initial position to either one of two displaced positions and are restored to their initial positions from either of said displaced positions by said restoring means.

GEORGE W. HOPKINS.
JON E. GROBL.

REFERENCES CITED

The following references are of record in the file of this patent:

UNITED STATES PATENTS

| Number | Name | Date |
|---|---|---|
| 2,089,770 | Suter et al. | Aug. 10, 1937 |
| 2,403,069 | Friden et al. | July 2, 1946 |
| 2,420,607 | Mendelsohn | May 13, 1947 |